United States Patent
Jia et al.

(10) Patent No.: US 11,412,421 B2
(45) Date of Patent: Aug. 9, 2022

(54) FACILITATING MANAGEMENT OF NETWORK RESOURCE ALLOCATION BASED ON DEVICE EFFECTIVE ISOTROPIC RADIATED POWER IN FIFTH GENERATION (5G) OR OTHER ADVANCED NETWORKS

(71) Applicant: AT&T Intellectual Property I, L.P., Atlanta, GA (US)

(72) Inventors: Yupeng Jia, Austin, TX (US); Hongyan Lei, Plano, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 275 days.

(21) Appl. No.: 16/512,291

(22) Filed: Jul. 15, 2019

(65) Prior Publication Data
US 2021/0022051 A1   Jan. 21, 2021

(51) Int. Cl.
*H04L 12/00* (2006.01)
*H04W 36/00* (2009.01)
*H04W 36/36* (2009.01)
*H04W 72/12* (2009.01)
*H04L 27/26* (2006.01)

(52) U.S. Cl.
CPC ..... *H04W 36/0055* (2013.01); *H04L 27/2614* (2013.01); *H04W 36/0079* (2018.08); *H04W 36/36* (2013.01); *H04W 72/1268* (2013.01)

(58) Field of Classification Search
None
See application file for complete search history.

(56) References Cited

U.S. PATENT DOCUMENTS

2011/0103282 A1* 5/2011 Jeon .................. H04W 52/40
                                                              370/311
2020/0266873 A1* 8/2020 Lim .................. H04W 8/22
(Continued)

OTHER PUBLICATIONS

3GPP, "3rd Generation Partnership Project Technical Specification Group Radio Access Network-Evolved Universal Terrestrial Radio Access (E-UTRA)-Evolved Universal Terrestrial Radio Access (E-UTRA)-Protocol specification", TS 36.331, Jun. 2018, 791 pages.
(Continued)

*Primary Examiner* — Noel R Beharry
*Assistant Examiner* — Lionel Preval
(74) *Attorney, Agent, or Firm* — Amin, Turocy & Watson, LLP

(57) ABSTRACT

Facilitating management of network resource allocation based on device effective isotropic radiated power in advanced networks (e.g., 4G, 5G, and beyond) is provided herein. Operations of a method can comprise receiving, by a system comprising a processor, a first indication of a baseband output power of a mobile device and a second indication of a minimum peak effective isotropic radiated power of the mobile device. Further, the method can comprise scheduling, by the system, uplink physical resource blocks based on the first indication and the second indication, wherein the scheduling is performed during initial access. The method can also include communicating the device EIRP between network nodes during handover such that a target network device obtains the device EIRP from a source network device.

20 Claims, 10 Drawing Sheets

(56) References Cited

U.S. PATENT DOCUMENTS

2020/0267736 A1* 8/2020 Hafeez .................. H04W 74/02
2020/0314765 A1* 10/2020 Jung .................... H04W 52/146
2020/0413350 A1* 12/2020 Yang .................... H04W 52/28
2020/0413394 A1* 12/2020 Yan ...................... H04B 7/0695

OTHER PUBLICATIONS

3GPP, 3rd Generation Partnership Project Technical Specification Group Radio Access Network-User Equipment (UE) conformance specification; Radio transmission and reception; Part 2: Range 2 Standalone TS 38.521-2, Sep. 2019.

* cited by examiner

FACILITATING MANAGEMENT OF NETWORK RESOURCE ALLOCATION BASED ON DEVICE EFFECTIVE ISOTROPIC RADIATED POWER IN FIFTH GENERATION (5G) OR OTHER ADVANCED NETWORKS

TECHNICAL FIELD

This disclosure relates generally to the field of network communications and, more specifically, to network resource allocation in fifth generation (5G) or other advanced networks.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) for wireless communications. Unique challenges exist to provide levels of service associated with forthcoming 5G, and/or other next generation, standards for wireless communication.

BRIEF DESCRIPTION OF THE DRAWINGS

Various non-limiting embodiments are further described with reference to the accompanying drawings in which.

DETAILED DESCRIPTION

Figure 1:
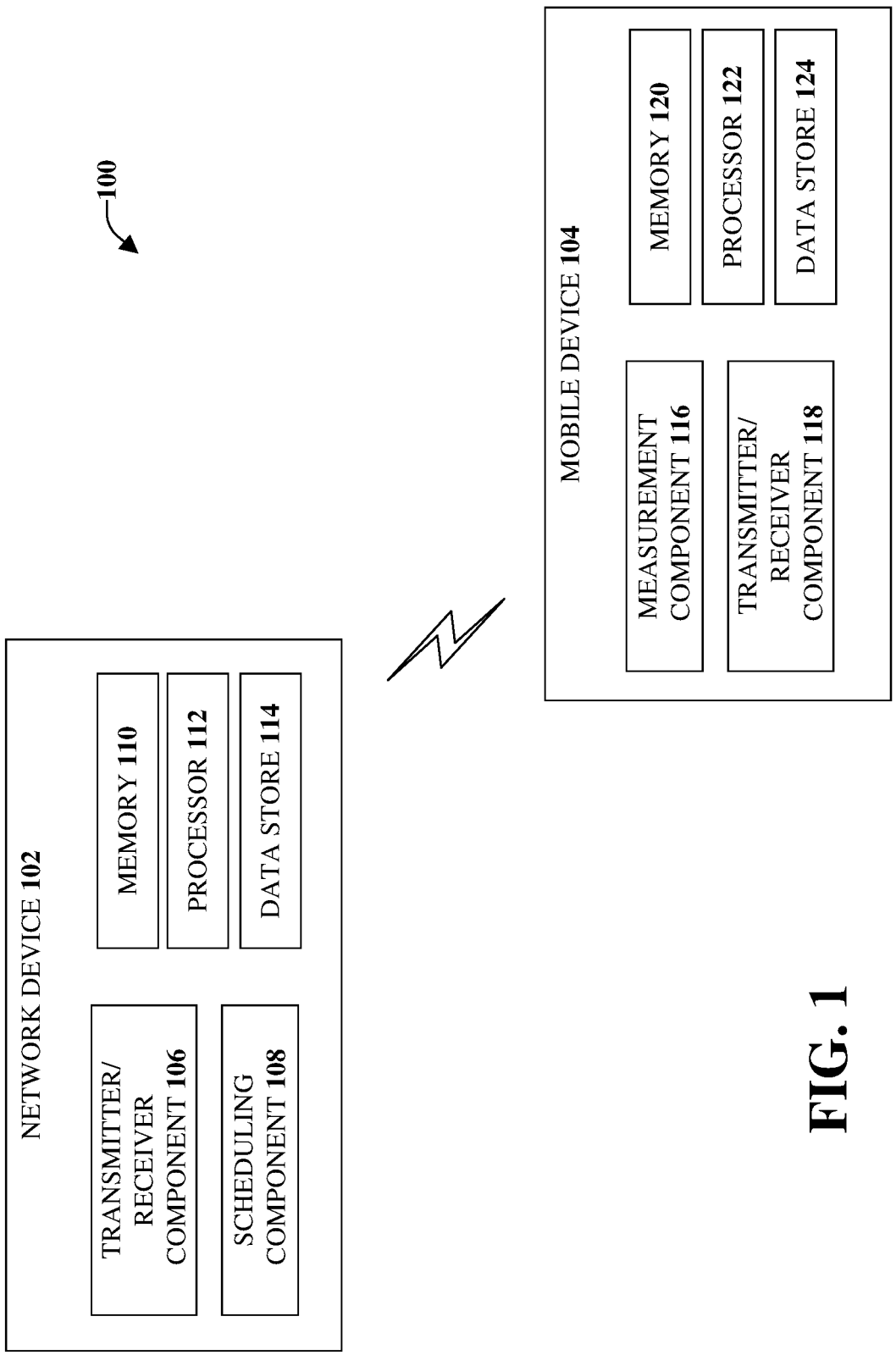
FIG. 1 illustrates an example, non-limiting, system for facilitating management of network resource allocation based on device effective isotropic radiated power in advanced networks in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details (and without applying to any particular networked environment or standard).

Described herein are systems, methods, articles of manufacture, and other embodiments or implementations that can facilitate management of network resource allocation based on device effective isotropic radiated power in advanced networks.

Using millimeter (mm) wave technology for 5G New Radio (NR) deployment can be more challenging than using the more mature technologies in the frequency bands below 6 Gigahertz (GHz). When considering the various available mmWave spectrums, the two bands that have been deployed (particularly in the United States of America and in Korea) are the 28 GHz band and the 37/39 GHz band. Due to high pathloss and/or penetration loss of mmWave spectrum, 5G NR mmWave deployment could need dense network topologies with Inter-Site Distances (ISD) of a few hundred meters.

The 5G NR mmWave network coverage simulation studies have revealed that the uplink is the limiting factor of ISD. Unlike the radiated RF requirements defined for LTE devices, the radiated requirements also account for the antenna (by incorporating antenna 3GPP defined an Effective Isotropic Radiated Power (EIRP) for mmWave devices) and can be an important parameter for mmWave User Equipment (UE) devices (e.g., at what power level to transmit a signal).

Considering EIRP while scheduling network resources can assist the network device(s) to improve network resource utilization and maximize the cell radius. However, traditionally, the network device(s) is not aware of the UE EIRP capability. When the Radio Access Network (RAN) schedules the Physical Resource Blocks (PRBs), the RAN could assign too many PRBs in the UE device Uplink (UL) transmission (blind to UE EIRP capability), which can cause uplink radio link failures (RLF) and can reduce the NR cell radius.

As discussed herein, the UE device can transmit its EIRP capability value to the network device(s). Based, at least in part, on the EIRP value, the network device can choose physical resource block(s), rather than blindly choosing the physical resource block(s), which is traditionally performed. According to some implementations, an "UE EIRP" Information Element (IE) can be added in an "UEassistedinformation" IE when the UE device connects to the network (e.g., during initial access). Based on the UE EIRP IE, the network device can schedule uplink PRBs based on the UE device's EIRP capability.

According to an embodiment, provided is a system that can comprise a processor and a memory that stores executable instructions that, when executed by the processor, facilitate performance of operations. The operations can comprise receiving, from a user equipment device, an effective isotropic radiated power capability of the user equipment device. Further, the operations can comprise scheduling uplink physical resource blocks based on the effective isotropic radiated power capability of the user equipment device.

In an example, receiving the effective isotropic radiated power capability can comprise receiving an information element that comprises an indication of the effective isotropic radiated power capability. Further to this example, receiving the information element can comprise receiving the information element based on the user equipment device communicatively connecting to the device.

Alternatively, or additionally, the device can be a first device and the operations can comprise determining communication of the user equipment device is to be handed off from the first device to a second device. The operations can also comprise sending a handover message to the second device. The handover message can comprise the information element.

According to some implementations, receiving the effective isotropic radiated power capability can comprise receiving a first indication of a measured baseband output power of the user equipment device. The operations also can comprise receiving a second indication of a minimum peak effective isotropic radiated power of the user equipment device.

In accordance with some implementations, the operations can comprise, prior to receiving the effective isotropic radiated power capability of the user equipment device, sending a request to the user equipment device to report the effective isotropic radiated power capability.

The operations can comprise, according to some implementations, determining the effective isotropic radiated power capability of the user equipment device satisfies a defined threshold capability. Further, the operations can comprise scheduling a first number of physical resource blocks to the user equipment device as compared to a second number of physical resource blocks scheduled based on the effective isotropic radiated power capability not satisfying the defined threshold capability.

In accordance with some implementations, the operations can comprise determining the effective isotropic radiated power capability of the user equipment device does not satisfy a defined threshold capability. Further, the operations can comprise scheduling a lower number of physical resource blocks to the user equipment device as compared to a number of physical resource blocks scheduled based on the effective isotropic radiated power capability satisfying the defined threshold capability.

According to some implementations, the operations can comprise determining the effective isotropic radiated power capability of the user equipment device satisfies a defined threshold capability. The operations also can comprise scheduling a digital modulation to the user equipment device.

The device can be deployed in a non-standalone deployment architecture. Alternatively, the device can be deployed in a standalone deployment architecture.

Another embodiment can relate to a method that can comprise receiving, by a system comprising a processor, a first indication of a baseband output power of a mobile device and a second indication of a minimum peak effective isotropic radiated power of the mobile device. Further, the method can comprise scheduling, by the system, uplink physical resource blocks based on the first indication and the second indication, wherein the scheduling is performed during initial access.

According to some implementations, scheduling of the uplink physical resource blocks can comprise scheduling a quantity of uplink physical resource blocks determined based on the second indication. Further to these implementations, the quantity can be higher based on the minimum peak effective isotropic radiated power satisfying a defined threshold. Further the quantity can be lower based on the minimum peak effective isotropic radiated power not satisfying the defined threshold.

Receiving the first indication and the second indication can comprise receiving an information element in a message received from the mobile device, according to an implementation. For example, the information element can comprise the first indication and the second indication.

According to some implementations, the initial access can be a first initial access, and the method can comprise retaining, by the system, the first indication and the second indication as historical information. The method also can comprise accessing, by the system, the historical information based on the mobile device establishing a second initial access with the system.

In accordance with some implementations, the mobile device can be a first mobile device, the initial access can be a first initial access, and the method can comprise retaining, by the system, the first indication and the second indication as historical information. The method also can comprise utilizing, by the system, the first indication and the second indication during a scheduling of uplink physical resource blocks for a second mobile device. First characteristics of the first mobile device and second characteristics of the second mobile device can be similar characteristics.

Another embodiment can relate to a machine-readable storage medium, comprising executable instructions that, when executed by a processor, facilitate performance of operations. The operations can comprise obtaining, from a user equipment device, an initial access request that comprises an information element that comprises a baseband output power measurement and a minimum peak effective isotropic radiated power of the user equipment device. Further, the operations can comprise scheduling a quantity of physical resource blocks to the user equipment device as a function of the baseband output power measurement and the minimum peak effective isotropic radiated power.

According to some implementations, the quantity of physical resource blocks can be a first quantity based on the minimum peak effective isotropic radiated power satisfying a defined threshold. Further, the quantity of physical resource blocks can be a second quantity based on the minimum peak effective isotropic radiated power not satisfying the defined threshold.

The operations can comprise, according to some implementations, determining communication of the user equipment device is scheduled to be transferred from a source cell device of a source cell of a communications network to a target cell device of a target cell of the communications network based on a movement of the user equipment device. The operations also can comprise facilitating conveyance of a message from the source cell to the target cell, wherein the message comprises the information element.

With reference initially to FIG. 1, illustrated is an example, non-limiting, system 100 for facilitating management of network resource allocation based on device effective isotropic radiated power in advanced networks in accordance with one or more embodiments described herein. Aspects of systems (e.g., the system 100 and the like), apparatuses, or processes explained in this disclosure can constitute machine-executable component(s) embodied within machine(s) (e.g., embodied in one or more computer readable mediums (or media) associated with one or more machines). Such component(s), when executed by the one or more machines (e.g., computer(s), computing device(s), virtual machine(s), and so on) can cause the machine(s) to perform the operations described.

In various embodiments, the system 100 can be any type of component, machine, device, facility, apparatus, and/or instrument that comprises a processor and/or can be capable of effective and/or operative communication with a wired and/or wireless network. Components, machines, apparatuses, devices, facilities, and/or instrumentalities that can comprise the system 100 can include tablet computing devices, handheld devices, server class computing machines and/or databases, laptop computers, notebook computers, desktop computers, cell phones, smart phones, consumer appliances and/or instrumentation, industrial and/or commercial devices, hand-held devices, digital assistants, multimedia Internet enabled phones, multimedia players, and the like.

As illustrated in FIG. 1, the system 100 can include a network device 102 and a user equipment device 104. The network device 102 can be included in a group of network devices of a wireless network. Although only a single user equipment device and a single network device are shown and described, the various aspects are not limited to this implementation. Instead, multiple user equipment devices and/or multiple network devices can be included in a communications system.

Further, the system 100 can be deployed in a non-standalone deployment architecture or in a standalone deployment architecture. In the non-standalone deployment architecture, NR is facilitated with the assistance of a Long Term Evolution (LTE) network, or another network. In the standalone deployment architecture, NR is implemented without the assistance of another network.

The network device 102 can include a transmitter/receiver component 106, a scheduling component 108, at least one memory 110, at least one processor 112, and at least one data store 114. The user equipment device 104 can include a measurement component 116, a transmitter/receiver component 118, at least one memory 120, at least one processor 122 and at least one data store 124.

The measurement component 116 can determine an Effective Isotropic Radiated Power (EIRP) capability of the user equipment device 104. The transmitter/receiver component 118 can convey the EIRP capability to the network device 102. According to some implementations, the user equipment device 104 (e.g., via the transmitter/receiver component 118) can transmit an information element that comprises an indication of the EIRP capability. For example, the information element can be transmitted during initial access (e.g., when the user equipment device 104 communicatively connects to the network device 102).

Based on the EIRP capability received at the network device 102 (e.g., via the transmitter/receiver component 106), the scheduling component 108 can schedule uplink PRBs to the user equipment device 104.

As an example, the 3GPP standard has defined the minimum peak EIRP, which is composed of UE device output power (baseband capability) and antenna gain (RF capability). The peak EIRP can vary between different device types. For example, the table below depicts the minimum EIRP for handheld mmWave UE devices in power class 3. The actual EIRP varies in different device SKUs

| 3GPP TS38.521-2 Table 6.2.1.3-1: UE minimum peak EIRP for power class 3 | |
| --- | --- |
| Operating Band | Minimum Peak EIRP (dBm) |
| n257 | 22.4 |
| n258 | 22.4 |
| n260 | 20.6 |
| n261 | 22.4 |

NOTE 1
minimum peak EIRP is defined as the lower limit without tolerance
NOTE 2
The requirements in this table are only applicable for UE with supports single band in FR2

Some UE devices might not be able to meet the minimum EIRP as defined in the above table (e.g., the EIRP is only 15 dBm). In addition, the maximum EIRP (upper bound limit by FCC) is 43 dBm for power class 3 devices, which means some UE devices in the market could transmit close to the peak EIRP in a carrier's network. If the RAN assigns the same PRB number regardless of the UE EIRP capability, the power density per PRB will be too low for some UEs. Therefore, the uplink radio link failures could frequently occur causing the UL transmission range shrink.

The RAN of traditional systems, as defined in the 3GPP specification, is not aware of the EIRP capability of the UE device. Thus, when the RAN schedules UL PRBs to the UE device during initial access, the RAN normally assigns the minimum PRBs to the UE device. However, during UL data transmission, blindly schedule PRBs without EIRP information will degrade network performance (e.g., at NR cell edge/poor RF condition) and the RAN assigns full PRBs for a given channel bandwidth, resulting in a low power density per RB, which can lead to frequency radio link bearer for NR.

Accordingly, the system 100 is configured such that the RAN (e.g., the network device 102) is aware of the EIRP capability of the user equipment device 104. In an example, one or more Information Elements (IE) can be defined as an "actual baseband output power" and a "minimum Peak EIRP" IE. Thus, when the user equipment device 104 connects to the network device 102, the user equipment device 104 can report the capability of the user equipment device 104, which can include EIRP.

In some implementations, the network device 102 can save the EIRP of the user equipment device 104 as historical data after (or before) the user equipment device 104 disconnects from the network device 102. The historical information can be used to optimize uplink performance when the user equipment device 104 reconnects to the network device 102 and/or when other user equipment devices connect to the network device 102. Further, in some implementations, during handover, the IE can be passed from a source cell (e.g., the network device) to a target cell (e.g., another network device) in a handover message.

According to some implementations, the network (e.g., the network device) can trigger UE inquiry and ask the UE to report the EIRP. In an example, the "Actual Baseband Output Power" and "minimum Peak EIRP" IE can be added to a UE-Multi-RAT Dual Connectivity (MRDC) Capability (UE-MRDC Capability) information. For example, the following information can be included in the UE-MRDC capability:

```
BasebandOutputPower :: = SEQUENCE {
    Actual Base Band Output Power Integer
}
Minimum EIRP :: = SEQUENCE {
    Minimum EIRP Integer
    Baseband output Power Integer
    Antenna Gain Integer
}
```

With continuing reference to FIG. 1, the transmitter/receiver component 106 can be configured to transmit to, and/or receive data from, the user equipment device 104, other network devices, and/or other user equipment devices. Through the transmitter/receiver component 106, the network device 102 can concurrently transmit and receive data, can transmit and receive data at different times, or combinations thereof. According to some implementations, the transmitter/receiver component 106 can facilitate communications between an identified entity associated with the user equipment device 104 (e.g., an owner of the user equipment device 104, a user of the user equipment device 104, and so on) and the network device 102. Further, the transmitter/receiver component 106 can be configured to receive, from the user equipment device 104 various content including multimedia content.

The at least one memory 110 can be operatively connected to the at least one processor 112. The at least one memory 110 can store executable instructions that, when executed by the at least one processor 112 can facilitate performance of operations. For example, the at least one memory 110 can store protocols associated with securely conveying IE information and/or other information as discussed herein. Further, the at least one memory 110 can facilitate action to control communication between the network device 102 and the user equipment device 104 such that the system 100 can employ stored protocols and/or algorithms to achieve improved communications in a wireless network as described herein.

Further, the transmitter/receiver component 118 can be configured to transmit to, and/or receive data from, the network device 102, other network devices, and/or other user equipment devices. Through the transmitter/receiver component 118, the user equipment device 104 can concurrently transmit and receive data, can transmit and receive data at different times, or combinations thereof. According to some implementations, the transmitter/receiver component 118 can facilitate communications between an identified entity associated with the user equipment device 104 (e.g., an owner of the user equipment device 104, a user of the user equipment device 104, and so on) and the network device 102. Further, the transmitter/receiver component 118 can be configured to receive, from the network device 102 various content including multimedia content.

The at least one memory 120 can be operatively connected to the at least one processor 122. The at least one memory 120 can store executable instructions that, when executed by the at least one processor 122 can facilitate performance of operations. For example, the at least one memory 120 can store protocols associated with securely conveying IE information and/or other information as discussed herein. Further, the at least one memory 120 can facilitate action to control communication between the network device 102 and the user equipment device 104 such that the system 100 can employ stored protocols and/or algorithms to achieve improved communications in a wireless network as described herein.

It should be appreciated that data stores (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The processors can facilitate respective analysis of information related to transmitted information embedded in one or more messages in a communication network. The processors can be processors dedicated to analyzing and/or generating information received, a processor that controls one or more components of the system 100, and/or a processor that both analyzes and generates information received and controls one or more components of the system 100.

Further, the term network device (e.g., network node, network node device) is used herein to refer to any type of network node serving communication devices and/or connected to other network nodes, network elements, or another network node from which the communication devices can receive a radio signal. In cellular radio access networks (e.g., universal mobile telecommunications system (UMTS) networks), network nodes can be referred to as base transceiver stations (BTS), radio base station, radio network nodes, base stations, NodeB, eNodeB (e.g., evolved NodeB), and so on. In 5G terminology, the network nodes can be referred to as gNodeB (e.g., gNB) devices. Network nodes can also comprise multiple antennas for performing various transmission operations (e.g., MIMO operations). A network node can comprise a cabinet and other protected enclosures, an antenna mast, and actual antennas. Network nodes can serve several cells, also called sectors, depending on the configuration and type of antenna. Examples of network nodes (e.g., network device 102) can include but are not limited to: NodeB devices, base station (BS) devices, access point (AP) devices, and radio access network (RAN) devices. The network nodes can also include multi-standard radio (MSR) radio node devices, comprising: an MSR BS, an eNode B, a network controller, a radio network controller (RNC), a base station controller (BSC), a relay, a donor node controlling relay, a base transceiver station (BTS), a transmission point, a transmission node, an Remote Radio Unit (RRU), a Remote Radio Head (RRH), nodes in distributed antenna system (DAS), and the like.

Figure 2:
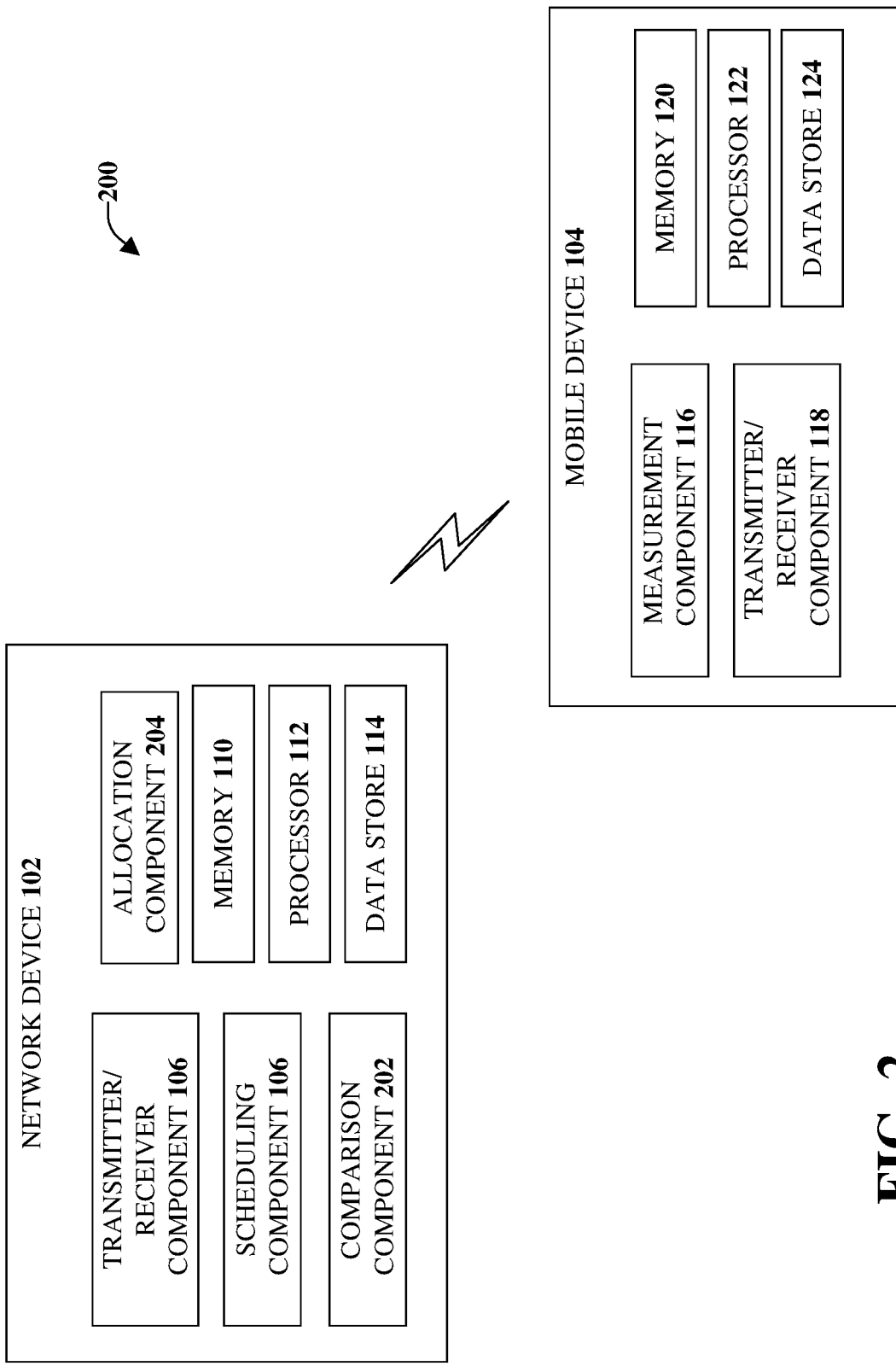
FIG. 2 illustrates an example, non-limiting system that facilitates scheduling physical resource blocks to a user equipment device based on the effective isotropic radiated power capability of the user equipment device in accordance with one or more embodiments described herein.

FIG. 2 illustrates an example, non-limiting, system 200 that facilitates scheduling physical resource blocks to a user equipment device based on the EIRP capability of the user equipment device in accordance with one or more embodiments described herein. Repetitive description of like elements employed in other embodiments described herein is omitted for sake of brevity. The system 200 can comprise one or more of the components and/or functionality of the system 100, and vice versa.

The network device 102 can include a comparison component 202 and an allocation component 204. The comparison component 202 can determine whether the EIRP capability of the user equipment device 104 satisfies a defined threshold capacity or does not satisfy the defined threshold capacity. Based on whether or not the EIRP capability satisfies the defined threshold capacity, the allocation component 204 can determine the quantity of PRBs to assigned to the user equipment device 104.

In further detail, the transmitter/receiver component 106 can receive the EIRP capability of the user equipment device 104 during initial access. According to some implementations, the network device 102 (e.g., via the transmitter/receiver component 106) can send a request to the user equipment device 104 to report its EIRP capability. For example, to make the request, a UE-CapabilityEnquiry IE can be used for reception from the user equipment device 104. However, according to some implementations, the user equipment device 104, without prompting by the network device 102, can send the EIRP capability alone or with other information.

In accordance with some implementations, to send the EIRP capability, the user equipment device 104 can send a first indication of a measured baseband output power of the user equipment device 104. Further to these implementations, the user equipment device 104 can send a second indication of a minimum peak effective isotropic radiated power of the user equipment device 104.

Upon or after received of the EIRP capability from the user equipment device 104, the comparison component 202 can evaluate the EIRP capability and determine if a defined threshold capacity is satisfied. If the EIRP capability satisfies the defined threshold capability, the allocation component 204 can allocate a first number of PRBs for the user equipment device 104. Accordingly, the scheduling component 108 can schedule the first number of PRBs to the user equipment device 104 as compared to a second number of physical resource blocks that would be scheduled if the EIRP capability does not satisfy the defined threshold. According to some implementations, the first number of PRBs can comprise more PRBs than the second number of PRBs.

Alternatively, if the EIRP capability does not satisfy the defined threshold capability, as determined by the comparison component 202, the allocation component 204 can allocate a lower number of PRBs for the user equipment device 104 as compared to a number of physical resource blocks scheduled based on the effective isotropic radiated power capability satisfying the defined threshold capability.

In another example, if the comparison component 202 determines the EIRP capability of the user equipment device 104 satisfies the defined threshold capability, the scheduling component can schedule a defined digital modulation to the user equipment device 104. The digital modulation can be classified as a higher-order modulation that can achieve a target uplink speed while using a lower number of PRBs. It is noted that a higher-order modulation is a type of digital modulation usually with an order of 4 or higher.

Figure 3:
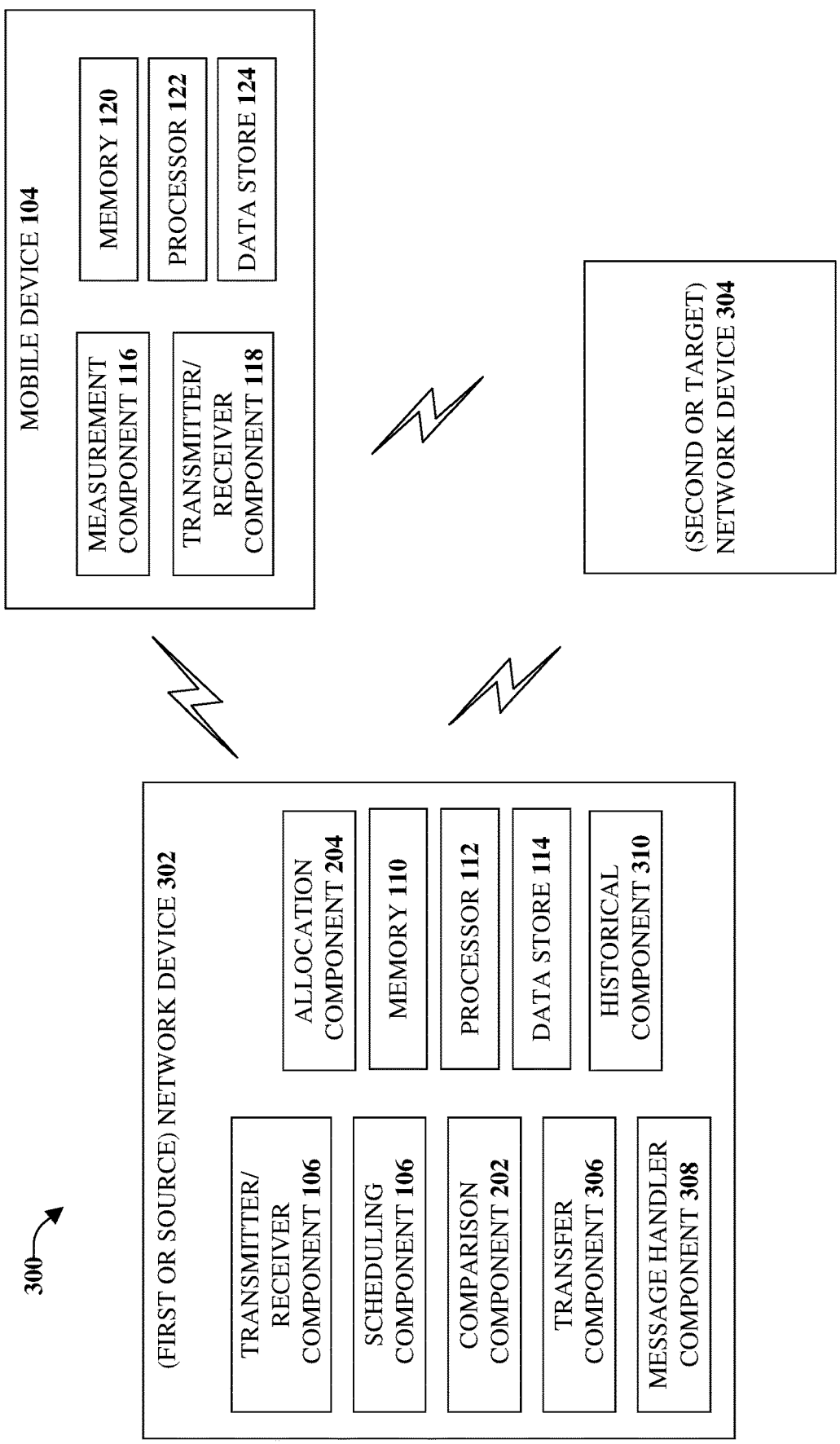
FIG. 3 illustrates an example, non-limiting system that facilitates transferring an effective isotropic radiated power capability of the user equipment device between network devices during a handover procedure in accordance with one or more embodiments described herein.

FIG. 3 illustrates an example, non-limiting, system 300 that facilitates transferring an EIRP capability of the user equipment device between network devices during a handover procedure in accordance with one or more embodiments described herein. Repetitive description of like elements employed in other embodiments described herein is omitted for sake of brevity. The system 300 can comprise one or more of the components and/or functionality of the system 100, the system 200, and vice versa.

As the user equipment device 104 is moved throughout the communication network, communication associated with the user equipment device 104 can be handed off from a source or first network device 302 (e.g., the network device 102) to a target or second network device 304. As illustrated, the first network device 302 can include a transfer component 306, a message handler component 308, and a historical component 310. The second network device 304 can comprise one or more of the components and/or functionality of the first network device 302.

The transfer component 306 can determine that network communication associated the user equipment device 104 is scheduled to be transferred from the first network device 302 to the second network device 304. For example, the determination by the transfer component 306 can be based on a location of the user equipment device 104, based on communication between the first network device 302 and the second network device 304, and/or other indications associated with handover procedures within a wireless communications network.

Based on a determination by the transfer component 306 that the communication is to be handed over to the second network device 304, the message handler component 308 can include in a handover message an information element that comprises an indication of the EIRP capability of the user equipment device 104. It is noted that transferring the information element between the two network devices (e.g., the first network device 302 and the second network device 304) can be quicker than the user equipment device 104 communicating the information element to the second network device 304 over-the-air (e.g., wirelessly). For example, communication between the two network devices can be over a wired connection and, thus, can be faster than the over-the-air communication. Thus, the device EIRP is communicated between network nodes during handover such that the target network node (e.g., the second network device 304) obtains the device EIRP from source network node (e.g., the first network device).

Further, the historical component 310 can retain information associated with the EIRP capability of the user equipment device 104. According to some implementations, the historical component 310 can be included, at least partially, in the data store 114. In alternative implementations, the historical component 310 can be communicatively coupled with the data store 114.

By retaining the EIRP capability information in the historical component 310 (and/or the data store 114), upon a subsequent connection between the first network device 302 and the user equipment device 104, the EIRP capability can be retrieved from the internal storage (at the first network device 302). The retrieval from the internal storage (e.g., the historical component 310 (and/or the data store 114)), can be quicker than the user equipment device 104 communicating the information element (again) to the network device 102 over-the-air (e.g., wirelessly).

Additionally, or alternatively, the historical information related to the user equipment device 104, and retained by the historical component 310 (or data store 114) can be utilized for other user equipment devices that connect to the first network device 302. For example, another user equipment device could be substantially similar to the user equipment device 104. For example, another user equipment device could be a same type of device as the user equipment device 104 (e.g., same Original Equipment Manufacturer (OEM), same model, and so on). Accordingly, it can be inferred that the same, or similar EIRP capability can be associated with the other user equipment device. Further, in some implementations, the other user equipment device might be able to reports its EIRP and, thus, utilization of the historical information for that other user equipment device can allow that user equipment device to achieve various benefits as discussed herein.

Figure 4:
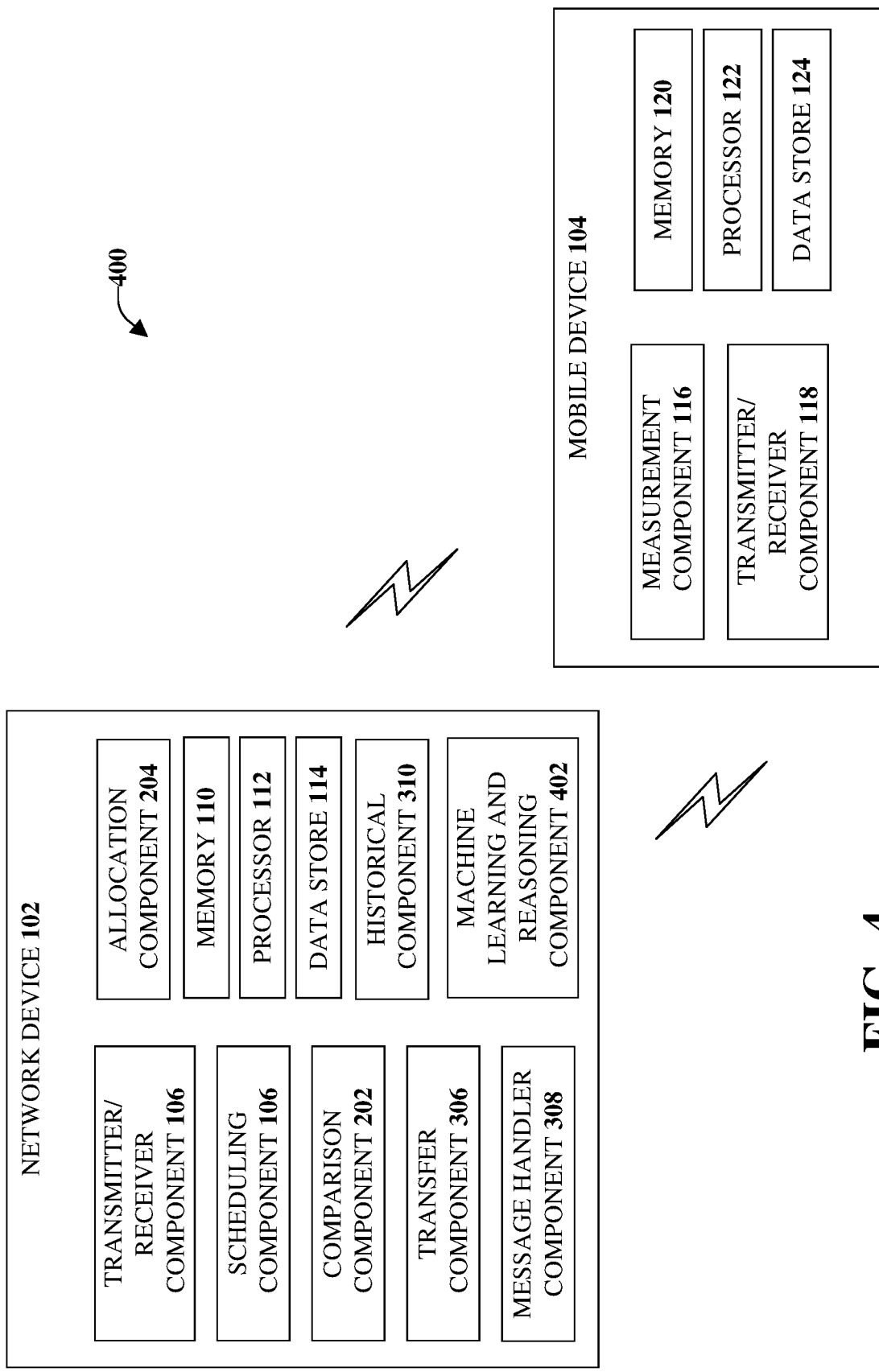
FIG. 4 illustrates an example, non-limiting, system that employs automated learning to facilitate one or more of the disclosed aspects in accordance with one or more embodiments described herein.

FIG. 4 illustrates an example, non-limiting, system 400 that employs automated learning to facilitate one or more of the disclosed aspects in accordance with one or more embodiments described herein. Repetitive description of like elements employed in other embodiments described herein is omitted for sake of brevity. The system 400 can comprise one or more of the components and/or functionality of the system 100, the system 200, the system 300, and vice versa.

As illustrated, the network device 102 can comprise a machine learning and reasoning component 402 that can be utilized to automate one or more of the disclosed aspects. The machine learning and reasoning component 402 can employ automated learning and reasoning procedures (e.g., the use of explicitly and/or implicitly trained statistical classifiers) in connection with performing inference and/or probabilistic determinations and/or statistical-based determinations in accordance with one or more aspects described herein.

For example, the machine learning and reasoning component 402 can employ principles of probabilistic and decision theoretic inference. Additionally, or alternatively, the machine learning and reasoning component 402 can rely on predictive models constructed using machine learning and/or automated learning procedures. Logic-centric inference can also be employed separately or in conjunction with probabilistic methods.

The machine learning and reasoning component 402 can infer a management of network resource allocation by obtaining knowledge about EIRP capability of one or more user equipment devices that report the EIRP capabilities during initial access as discussed herein. Based on this knowledge, the machine learning and reasoning component 402 can make an inference based on a scheduling of uplink PRBs, a number of PRBs to schedule, devices with similar EIRP capabilities, or combinations thereof.

As used herein, the term "inference" refers generally to the process of reasoning about or inferring states of a system, a component, a module, an environment, and/or devices from a set of observations as captured through events, reports, data and/or through other forms of communication. Inference can be employed to identify conformance of a measured EIRP capability with a defined threshold capability, similar devices for which a historical EIRP capability can be applied, or can generate a probability distribution over states, for example. The inference can be probabilistic. For example, computation of a probability distribution over states of interest based on a consideration of data and/or events. The inference can also refer to techniques employed for composing higher-level events from a set of events and/or data. Such inference can result in the construction of new events and/or actions from a set of observed events and/or stored event data, whether or not the events are correlated in close temporal proximity, and whether the events and/or data come from one or several events and/or data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

The various aspects (e.g., in connection with managing network resource allocation based on EIRP capability of a user equipment device) can employ various artificial intelligence-based schemes for carrying out various aspects thereof. For example, a process for determining if a particular number of PRBs should be scheduled for a user equipment device can be enabled through an automatic classifier system and process.

A classifier is a function that maps an input attribute vector, x=(x1, x2, x3, x4, xn), to a confidence that the input belongs to a class. In other words, f(x)=confidence(class). Such classification can employ a probabilistic and/or statistical-based analysis (e.g., factoring into the analysis utilities and costs) to provide a prognosis and/or infer one or more actions that should be employed to determine whether uplink PRBs scheduled can be automatically performed.

A Support Vector Machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that can be similar, but not necessarily identical to training data. Other directed and undirected model classification approaches (e.g., naïve Bayes, Bayesian networks, decision trees, neural networks, fuzzy logic models, and probabilistic classification models) providing different patterns of independence can be employed. Classification as used herein, can be inclusive of statistical regression that is utilized to develop models of priority.

One or more aspects can employ classifiers that are explicitly trained (e.g., through a generic training data) as well as classifiers that are implicitly trained (e.g., by accessing retained historical information, by identifying similar devices, and so on). For example, SVMs can be configured through a learning or training phase within a classifier constructor and feature selection module. Thus, a classifier (s) can be used to automatically learn and perform a number of functions, including but not limited to determining, according to a predetermined criterion, when to implement scheduling of PRBs based on EIRP capability of a similar device, the quantity of PRBs to schedule, and so forth. The criteria can include, but is not limited to, similar devices, historical information, and so forth.

Additionally, or alternatively, an implementation scheme (e.g., a rule, a policy, and so on) can be applied to manage network resource allocation as discussed herein. In some implementations, based upon a predefined criterion, the rules-based implementation can automatically and/or dynamically schedule resources. In response thereto, the rule-based implementation can automatically interpret and carry out functions associated with scheduling PRBs by employing a predefined and/or programmed rule(s) based upon any desired criteria.

Methods that can be implemented in accordance with the disclosed subject matter, will be better appreciated with reference to various flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
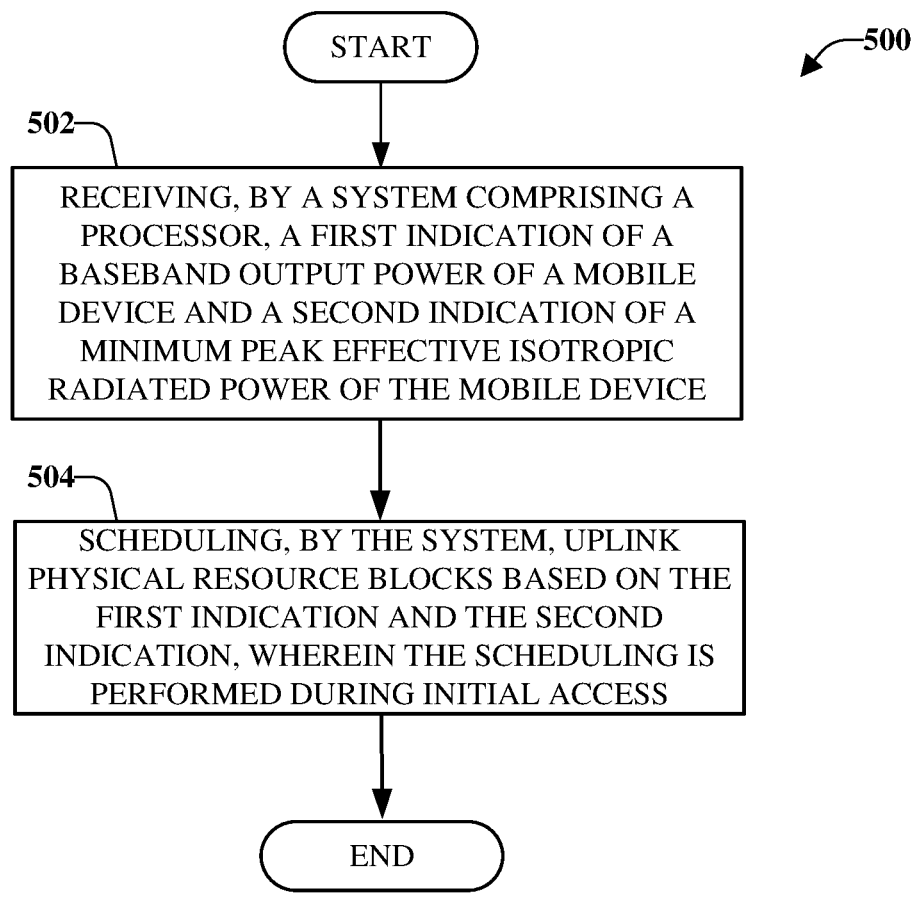
FIG. 5 illustrates a flow diagram of an example, non-limiting, computer-implemented method for facilitating network resource allocation management in advanced networks in accordance with one or more embodiments described herein.

FIG. 5 illustrates a flow diagram of an example, non-limiting, computer-implemented method 500 for facilitating network resource allocation management in advanced networks in accordance with one or more embodiments described herein. Repetitive description of like elements employed in other embodiments described herein is omitted for sake of brevity.

In some implementations, a system comprising a processor can perform the computer-implemented method 500 and/or other methods discussed herein. In other implementations, a device comprising a processor can perform the computer-implemented method 500 and/or other methods discussed herein. In other implementations, a machine-readable storage medium, can comprise executable instructions that, when executed by a processor, facilitate performance of operations, which can be the operations discussed with respect to the computer-implemented method 500 and/or other methods discussed herein. In further implementations, a computer readable storage device comprising executable instructions that, in response to execution, cause a system comprising a processor to perform operations, which can be operations discussed with respect to the computer-implemented method 500 and/or other methods discussed herein.

At 502 of the computer-implemented method 500, a system comprising a processor can receive a first indication of a baseband output power of a mobile device and a second indication of a minimum peak EIRP of the mobile device (e.g., via the transmitter/receiver component 106). According to some implementations, receiving the first indication and the second indication can comprise receiving an information element in a message received from the mobile device. The information element can comprise the first indication and the second indication.

Based on the first indication and the second indication, at 504, the system can schedule uplink physical resource blocks based on the first indication and the second indication (e.g., via the scheduling component 108). Scheduling the physical resource blocks can be performed during initial access. In some implementations, scheduling of the uplink physical resource blocks can comprise scheduling a quantity of uplink physical resource blocks determined based on the second indication.

Figure 6:
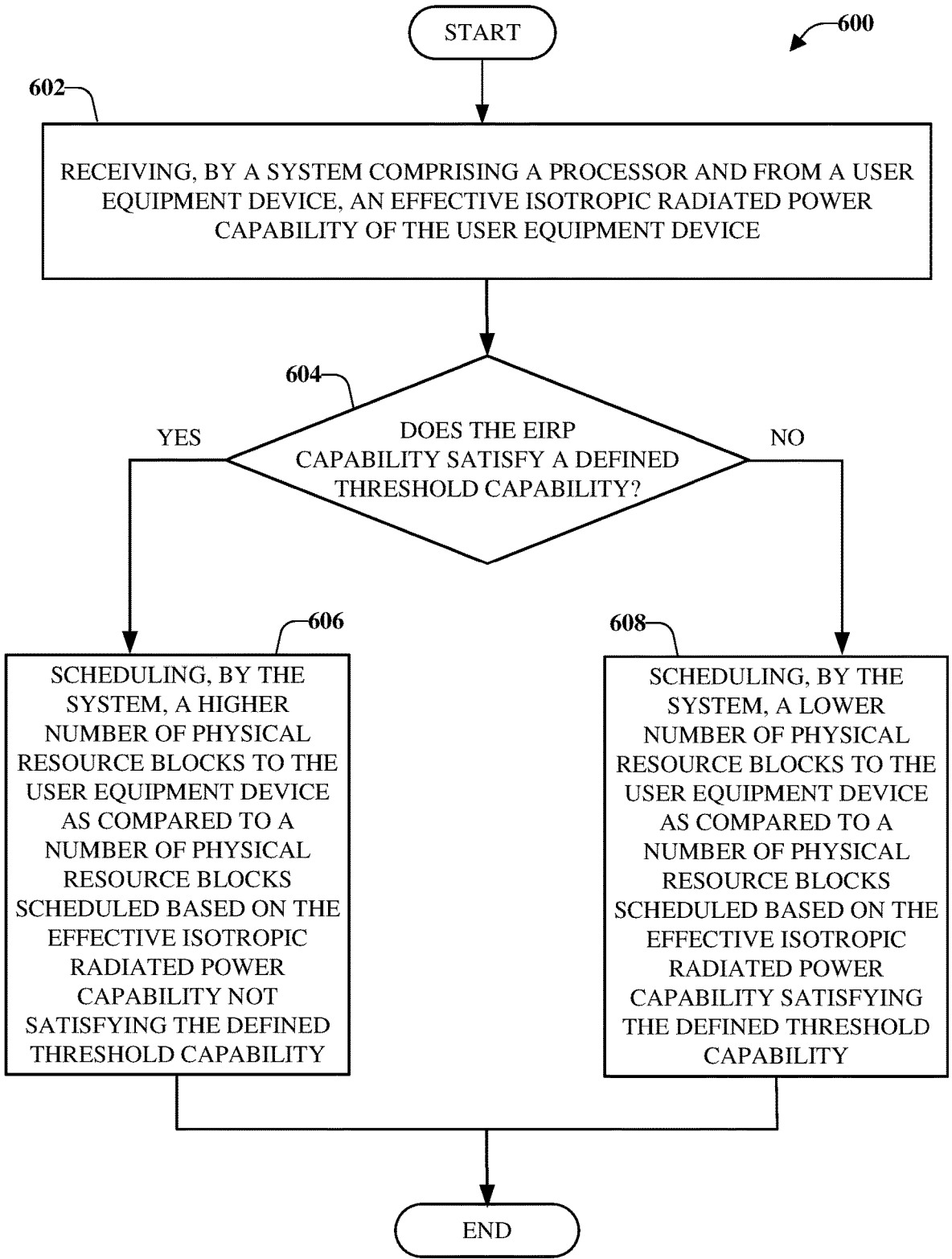
FIG. 6 illustrates a flow diagram of an example, non-limiting, computer-implemented method for assigning a quantity of uplink physical resource blocks based on an effective isotropic radiated power capability of a user equipment device in accordance with one or more embodiments described herein.

FIG. 6 illustrates a flow diagram of an example, non-limiting, computer-implemented method 600 for assigning a quantity of uplink physical resource blocks based on an EIRP capability of a user equipment device in accordance with one or more embodiments described herein. Repetitive description of like elements employed in other embodiments described herein is omitted for sake of brevity.

In some implementations, a system comprising a processor can perform the computer-implemented method 600 and/or other methods discussed herein. In other implementations, a device comprising a processor can perform the computer-implemented method 600 and/or other methods discussed herein. In other implementations, a machine-readable storage medium, can comprise executable instructions that, when executed by a processor, facilitate performance of operations, which can be the operations discussed with respect to the computer-implemented method 600 and/or other methods discussed herein. In further implementations, a computer readable storage device comprising executable instructions that, in response to execution, cause a system comprising a processor to perform operations, which can be operations discussed with respect to the computer-implemented method 600 and/or other methods discussed herein.

At 602 of the computer-implemented method 600, a system comprising a processor can receive an EIRP capability of a user equipment device (e.g., via the transmitter/receiver component 106). In an example, receiving the EIRP capability can comprise receiving a first indication of a baseband output power of a mobile device and a second indication of a minimum peak effective isotropic radiated power of the user equipment device. According to some implementations, the EIRP capability can be received in response to a request for the EIRP information.

A determination can be made, at 604, whether the EIRP capability satisfies a defined threshold capability (e.g., via the comparison component 202). The defined threshold capability can be based on various design considerations associated with improved communications in a wireless communications network.

If the determination is that the EIRP capability satisfies the defined threshold capability ("YES"), at 606 the system can schedule a higher number of physical resource blocks to the user equipment device as compared to a number of physical resource blocks scheduled based on the effective isotropic radiated power capability not satisfying the defined threshold capability (e.g., via the scheduling component 108). Alternatively, based on the determination that the EIRP capability satisfies the defined threshold capability, the system can schedule a digital modulation to the user equipment device. For example, the digital modulation can be classified as a higher-order modulation that achieves a target uplink speed while using a lower number of physical resource blocks.

If the determination at 604 is that the EIRP capability does not satisfy the defined threshold capability ("NO"), at 608 the system can schedule a lower number of physical resource blocks to the user equipment device as compared to a number of physical resource blocks scheduled based on the effective isotropic radiated power capability satisfying the defined threshold capability (e.g., via the scheduling component 108).

Figure 7:
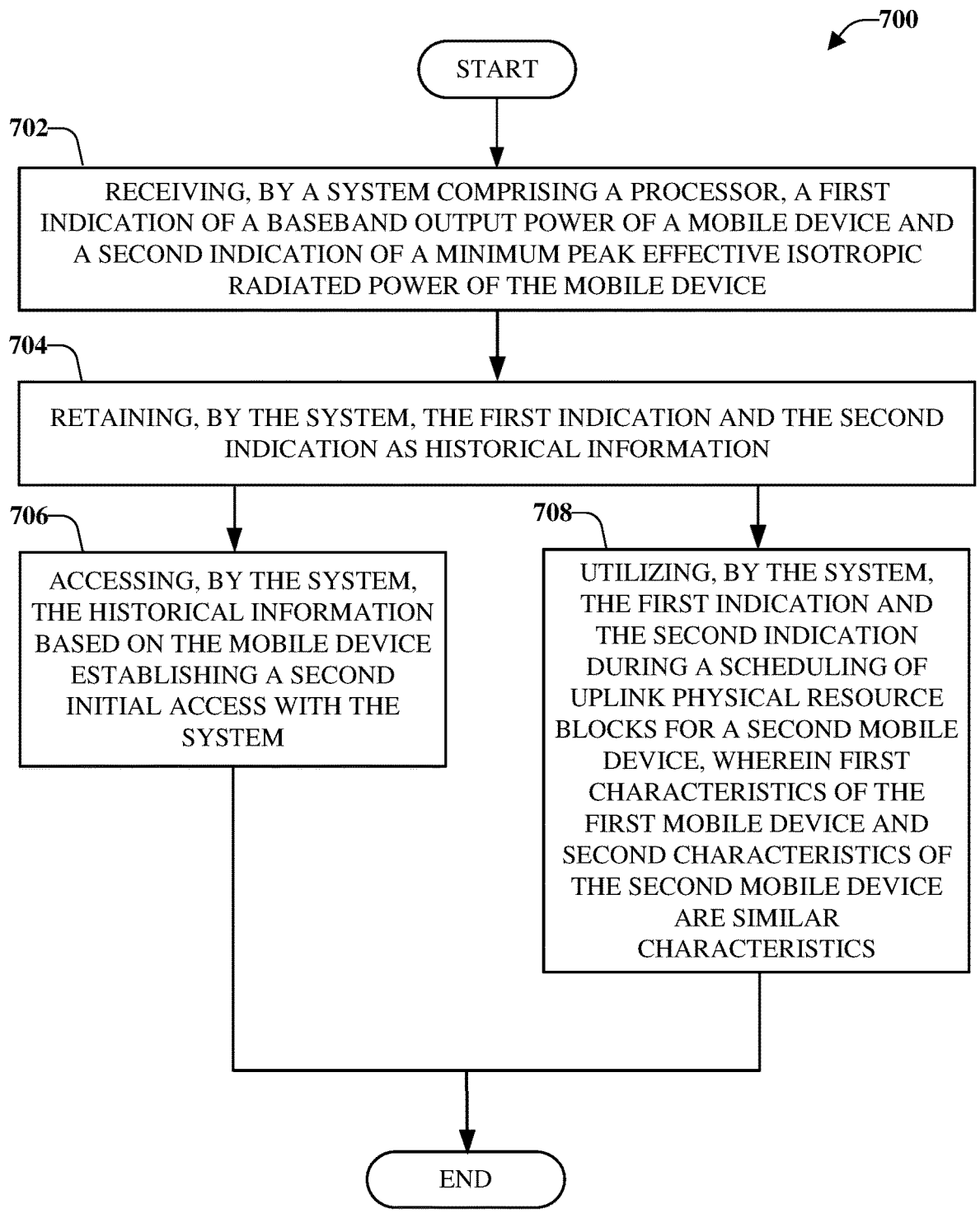
FIG. 7 illustrates a flow diagram of an example, non-limiting, computer-implemented method for utilizing historical effective isotropic radiated power capability of a user equipment device in accordance with one or more embodiments described herein.

FIG. 7 illustrates a flow diagram of an example, non-limiting, computer-implemented method 700 for utilizing historical EIRP capability of a user equipment device in accordance with one or more embodiments described herein. Repetitive description of like elements employed in other embodiments described herein is omitted for sake of brevity.

In some implementations, a system comprising a processor can perform the computer-implemented method 700 and/or other methods discussed herein. In other implementations, a device comprising a processor can perform the computer-implemented method 700 and/or other methods discussed herein. In other implementations, a machine-readable storage medium, can comprise executable instructions that, when executed by a processor, facilitate performance of operations, which can be the operations discussed with respect to the computer-implemented method 700 and/or other methods discussed herein. In further implementations, a computer readable storage device comprising executable instructions that, in response to execution, cause a system comprising a processor to perform operations, which can be operations discussed with respect to the computer-implemented method 700 and/or other methods discussed herein.

At 702 of the computer-implemented method 700, a system comprising a processor can receive a first indication of a baseband output power of a mobile device and a second indication of a minimum peak effective isotropic radiated power of the mobile device (e.g., via the transmitter/receiver component 106). According to some implementations, the first indication and the second indication can be received during initial access.

Upon receipt of the first indication and second indication (or receipt of an EIRP capability), the first indication and the second indication can be retained as historical information, at 704 (e.g., via the historical component 310). According to some implementations, the first indication and the second indication can be retained as historical information upon or after the user equipment device is no longer connected to a network device (e.g., upon or after handoff, and so on).

Further, at 706, the system can access the historical information based on the mobile device establishing a second initial access with the system. By accessing the retained historical information, the scheduling of the user equipment device can be quicker than having to wait for the information to be transmitted by the user equipment device over-the-air.

Alternatively, at 708, the system can utilize the first indication and the second indication during a scheduling of uplink physical resource blocks for a second mobile device. For example, first characteristics of the first mobile device and second characteristics of the second mobile device are similar characteristics.

As discussed herein, according to various implementations, an "Actual Baseband Output Power" and "minimum Peak EIRP" IE can be added, for example, in a 3 GPP standard UE capability message. Further, upon or after a mobile device connects to the network device, the mobile device can report is capability and can include its EIRP. During handover, the IE can be passed from a source cell to a target cell in handover message. In addition, the network can utilize this algorithm to optimize the user experience and improve spectrum utilization.

In an example, for a mobile device with a higher EIRP, the network device can schedule more PRBs or higher order modulation for UL transmission to get higher UL speed, and larger UL coverage. Higher order modulation can help achieve the same UL speed with less PRBs/improve spectrum efficiency.

In another example, for a mobile device with a lower EIRP, the network device can lower the PRBs when the mobile device is at poor RF/cell edge, and can dynamically switch the NR UL to LTE UL to ensure smooth user data experience and retain NR DL coverage.

Further, according to some implementations, the network device can save the reported EIRP as historical data. The historical data can help optimize the performance of other UEs with same EIRPs, for example.

Described herein are systems, methods, articles of manufacture, and other embodiments or implementations that can facilitate management of network resource allocation based on device effective isotropic radiated power in advanced networks. Facilitating management of network resource allocation based on device effective isotropic radiated power can be implemented in connection with any type of device with a connection to the communications network (e.g., a mobile handset, a computer, a handheld device, etc.) any Internet of things (IoT) device (e.g., toaster, coffee maker, blinds, music players, speakers, etc.), and/or any connected vehicles (e.g., cars, airplanes, boats, space rockets, and/or other at least partially automated vehicles (e.g., drones), and so on). In some embodiments, the non-limiting term User Equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, Laptop Embedded Equipped (LEE), laptop mounted equipment (LME), USB dongles etc. Note that the terms element, elements and antenna ports can be interchangeably used but carry the same meaning in this disclosure. The embodiments are applicable to single carrier as well as to Multi-Carrier (MC) or Carrier Aggregation (CA) operation of the UE. The term Carrier Aggregation (CA) is also called (e.g., interchangeably called) "multi-carrier system," "multi-cell operation," "multi-carrier operation," "multi-carrier" transmission and/or reception.

In some embodiments, the non-limiting term radio network node or simply network node is used. It can refer to any type of network node that serves one or more UEs and/or that is coupled to other network nodes or network elements or any radio node from where the one or more UEs receive a signal. Examples of radio network nodes are Node B, Base Station (BS), Multi-Standard Radio (MSR) node such as MSR BS, eNode B, network controller, Radio Network Controller (RNC), Base Station Controller (BSC), relay, donor node controlling relay, Base Transceiver Station (BTS), Access Point (AP), transmission points, transmission nodes, RRU, RRH, nodes in Distributed Antenna System (DAS) etc.

To meet the huge demand for data centric applications, 4G standards can be applied to 5G, also called New Radio (NR) access. The 5G networks can comprise the following: data rates of several tens of megabits per second supported for tens of thousands of users; 1 gigabit per second can be offered simultaneously (or concurrently) to tens of workers on the same office floor; several hundreds of thousands of simultaneous (or concurrent) connections can be supported for massive sensor deployments; spectral efficiency can be enhanced compared to 4G; improved coverage; enhanced signaling efficiency; and reduced latency compared to Long Term Evolution (LTE).

Multiple Input, Multiple Output (MIMO) systems can significantly increase the data carrying capacity of wireless systems. For these reasons, MIMO is an integral part of the third and fourth generation wireless systems (e.g., 3G and 4G). In addition, 5G systems also employ MIMO systems, which are referred to as massive MIMO systems (e.g., hundreds of antennas at the transmitter side (e.g., network) and/or receiver side (e.g., user equipment). With a $(N_t, N_r)$ system, where $N_t$ denotes the number of transmit antennas and Nr denotes the receive antennas, the peak data rate multiplies with a factor of $N_t$ over single antenna systems in rich scattering environment.

In addition, advanced networks, such as a 5G network can be configured to provide more bandwidth than the bandwidth available in other networks (e.g., 4G network, 5G network). A 5G network can be configured to provide more ubiquitous connectivity. In addition, more potential of applications and services, such as connected infrastructure, wearable computers, autonomous driving, seamless virtual and augmented reality, "ultra-high-fidelity" virtual reality, and so on, can be provided with 5G networks. Such applications and/or services can consume a large amount of bandwidth. For example, some applications and/or services can consume about fifty times the bandwidth of a high-definition video stream, Internet of Everything (IoE), and others. Further, various applications can have different network performance requirements (e.g., latency requirements and so on).

Cloud Radio Access Networks (cRAN) can enable the implementation of concepts such as SDN and Network Function Virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open Application Programming Interfaces (APIs) and move the network core towards an all Internet Protocol (IP), cloud based, and software driven telecommunications network. The SDN controller can work with, or take the place of, Policy and Charging Rules Function (PCRF) network elements so that policies such as quality of service and traffic management and routing can be synchronized and managed end to end.

Figure 8:
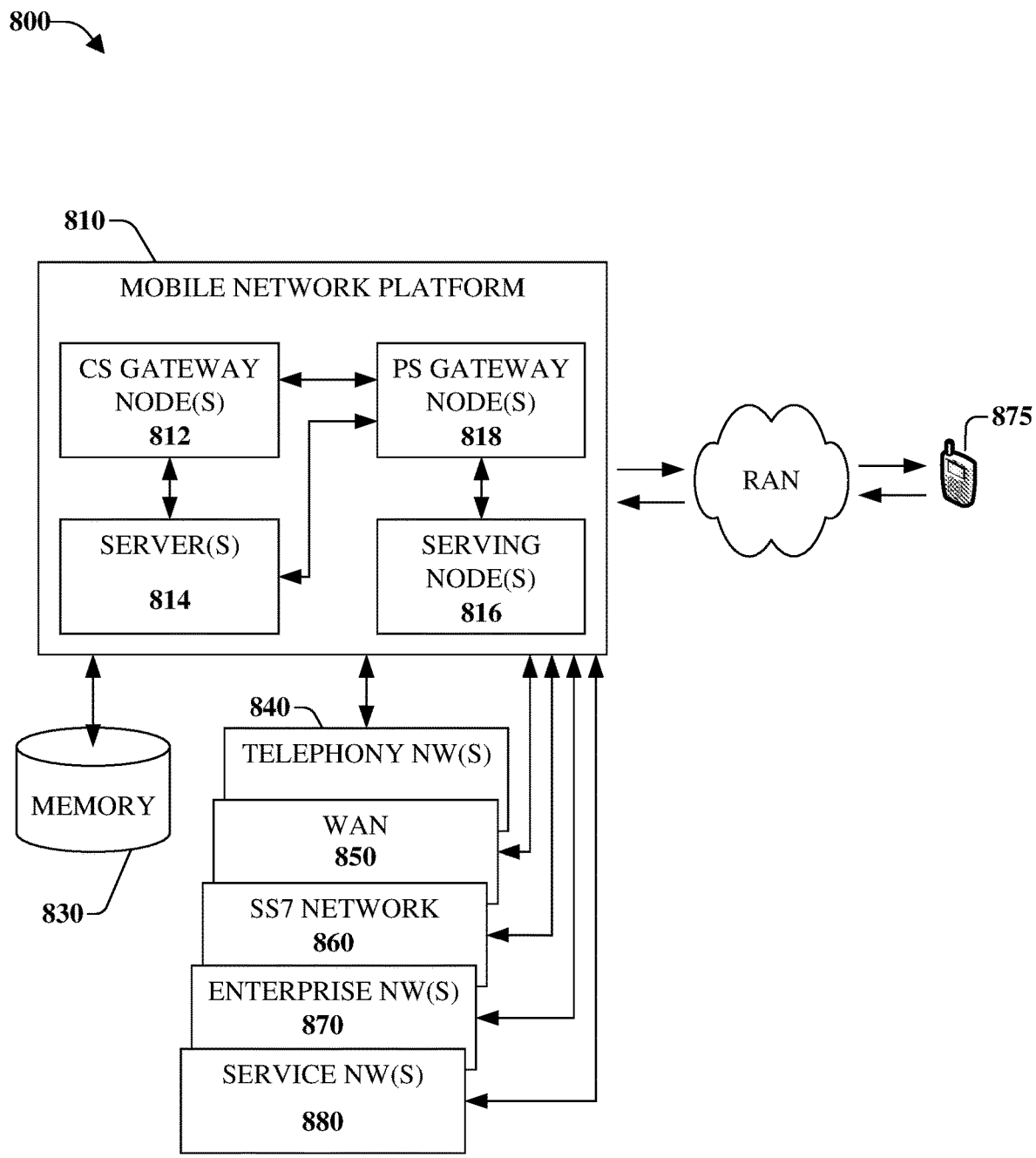
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., Internet protocol (IP), frame relay, asynchronous transfer mode (ATM)) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks such as telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network 860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) such as IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format, and so on) such flows. Such application(s) can include add-on features to standard services (for example, provisioning, billing, user support, and so forth) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless network platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
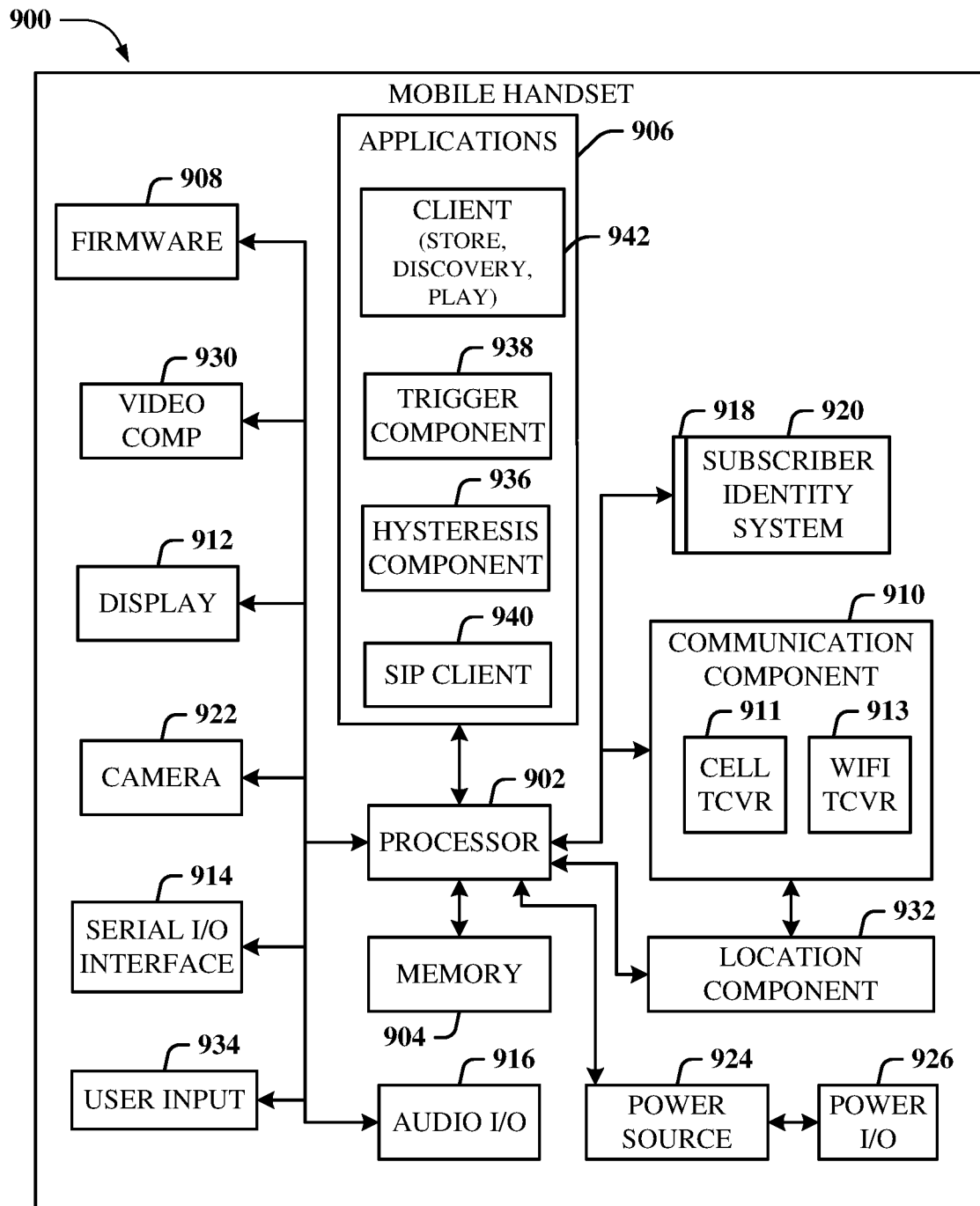
FIG. 9 illustrates an example block diagram of an example mobile handset operable to engage in a system architecture that facilitates wireless communications according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information, and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
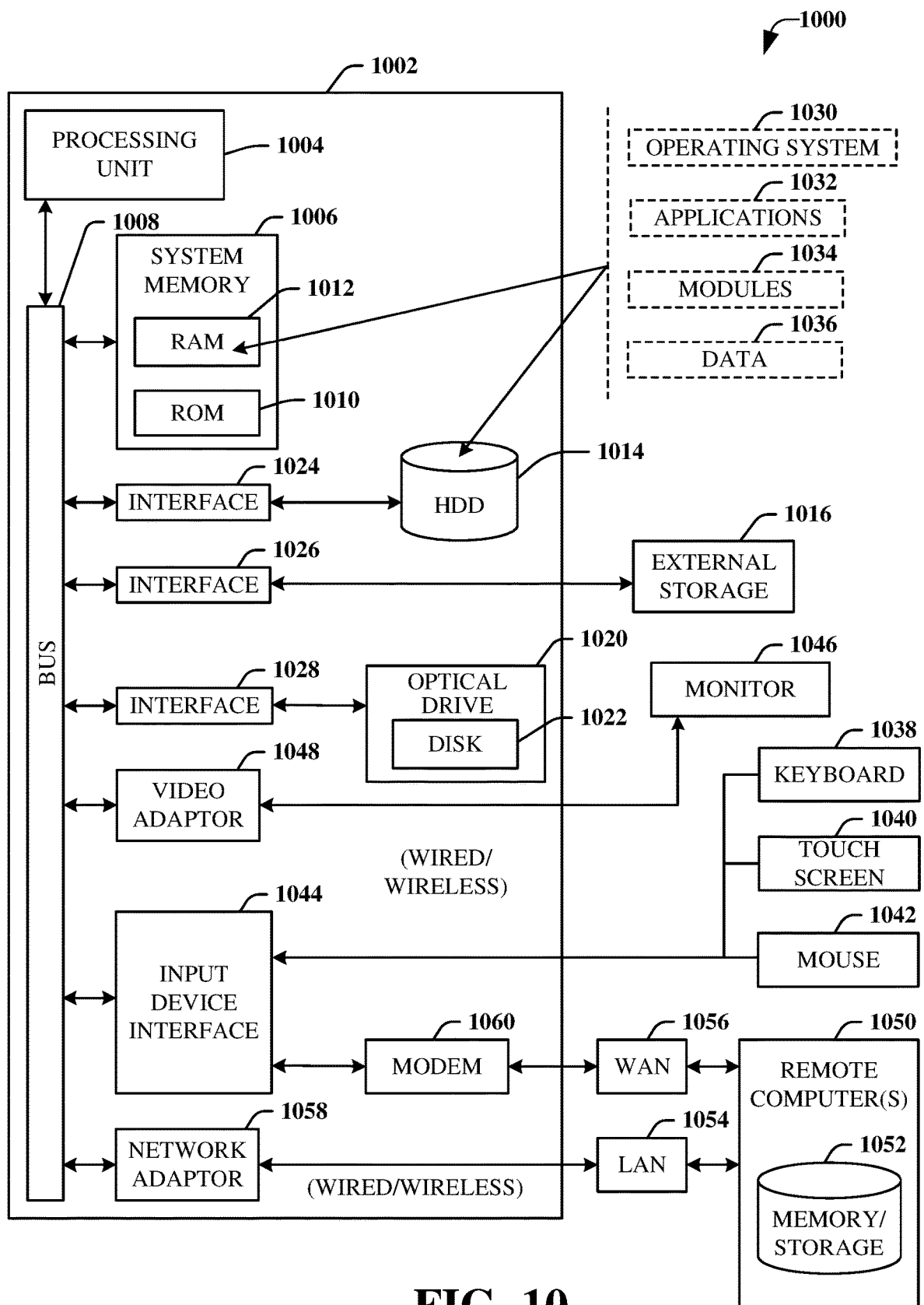
FIG. 10 illustrates an example block diagram of an example computer operable to engage in a system architecture that facilitates wireless communications according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed aspects can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, "5G" can also be referred to as NR access. Accordingly, systems, methods, and/or machine-readable storage media for facilitating link adaptation of downlink control channel for 5G systems are desired. As used herein, one or more aspects of a 5G network can comprise, but is not limited to, data rates of several tens of megabits per second (Mbps) supported for tens of thousands of users; at least one gigabit per second (Gbps) to be offered simultaneously to tens of users (e.g., tens of workers on the same office floor); several hundreds of thousands of simultaneous connections supported for massive sensor deployments; spectral efficiency significantly enhanced compared to 4G; improvement in coverage relative to 4G; signaling efficiency enhanced compared to 4G; and/or latency significantly reduced compared to LTE.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. Network equipment, comprising:
a processor; and
a memory that stores executable instructions that, when executed by the processor, facilitate performance of operations, comprising:
receiving, from a user equipment, an information element that comprises an effective isotropic radiated power capability of the user equipment;
based on the effective isotropic radiated power capability, selecting an order of modulation; and
based on the effective isotropic radiated power capability of the user equipment and the order of modulation, scheduling uplink physical resource blocks for the user equipment.

2. The network equipment of claim 1, wherein the receiving comprises receiving the information element based on the user equipment communicatively connecting to the network equipment.

3. The network equipment of claim 1, wherein the network equipment is a first network equipment, and wherein the operations further comprise:
determining communication of the user equipment is to be handed off from the first network equipment to a second network equipment; and
sending a handover message to the second network equipment, wherein the handover message comprises the information element.

4. The network equipment of claim 1, wherein the receiving comprises:
receiving a first indication of a measured baseband output power of the user equipment; and
receiving a second indication of a minimum peak effective isotropic radiated power of the user equipment.

5. The network equipment of claim 1, wherein the operations further comprise:
prior to the receiving, sending a request to the user equipment to report the effective isotropic radiated power capability.

6. The network equipment of claim 1, wherein the operations further comprise:
determining the effective isotropic radiated power capability of the user equipment satisfies a defined threshold capability; and
scheduling a first number of physical resource blocks to the user equipment as compared to a second number of physical resource blocks scheduled based on the effective isotropic radiated power capability not satisfying the defined threshold capability, wherein the first number comprises more physical resource blocks than the second number.

7. The network equipment of claim 1, wherein the operations further comprise:
determining the effective isotropic radiated power capability of the user equipment does not satisfy a defined threshold capability; and
scheduling a first number of physical resource blocks to the user equipment as compared to a second number of physical resource blocks scheduled based on the effective isotropic radiated power capability satisfying the defined threshold capability, wherein the first number comprises fewer physical resource blocks than the second number.

8. The network equipment of claim 1, wherein the network equipment is deployed in a non-standalone deployment architecture.

9. The network equipment of claim 1, wherein the network equipment is deployed in a standalone deployment architecture.

10. The network equipment of claim 1, wherein scheduling the uplink physical resource blocks comprises scheduling a selected number of uplink physical resource blocks, and wherein the selected number was selected based on a target uplink speed and the order of modulation.

11. The network equipment of claim 1, wherein selecting the order of modulation is further based on a target uplink speed.

12. A method, comprising:
receiving, by a system comprising a processor, a first indication of a baseband output power of a mobile device and a second indication of an effective isotropic radiated power of the mobile device; and
based on the second indication, selecting an order of modulation; and
based on the first indication, the second indication, and the order of modulation, scheduling, by the system, uplink physical resource blocks, wherein the scheduling is performed during initial access.

13. The method of claim 12, wherein the scheduling comprises scheduling a quantity of uplink physical resource blocks determined based on the second indication.

14. The method of claim 13, wherein the quantity is higher based on the peak effective isotropic radiated power satisfying a defined threshold, and wherein the quantity is lower based on the peak effective isotropic radiated power not satisfying the defined threshold.

15. The method of claim 12, wherein the receiving comprises receiving the first information element and the second information element in a message received from the mobile device.

16. The method of claim 12, wherein the initial access comprises a first initial access, and wherein the method further comprises:
retaining, by the system, the first indication and the second indication as historical information; and
accessing, by the system, the historical information based on the mobile device establishing a second initial access with the system.

17. The method of claim 12, wherein the mobile device is a first mobile device, wherein the initial access is a first initial access, and wherein the method further comprises:
retaining, by the system, the first indication and the second indication as historical information; and
utilizing, by the system, the first indication and the second indication during a scheduling of uplink physical resource blocks for a second mobile device, wherein first characteristics of the first mobile device and second characteristics of the second mobile device are similar characteristics.

18. A non-transitory machine-readable medium, comprising executable instructions that, when executed by a processor of a scheduling device, facilitate performance of operations, comprising:
obtaining, from a user equipment, an initial access request that comprises a first information element that comprises a baseband output power measurement and a second information element that comprises a minimum peak effective isotropic radiated power of the user equipment; and based on the second information element, selecting an order of modulation; and based on the first information element, the second information element, a target uplink speed, and the order of modulation, scheduling a quantity of physical resource blocks for the user equipment.

19. The non-transitory machine-readable medium of claim 18, wherein the quantity of physical resource blocks is a first quantity based on the minimum peak effective isotropic radiated power satisfying a defined threshold, and wherein the quantity of physical resource blocks is a second quantity based on the minimum peak effective isotropic radiated power not satisfying the defined threshold.

20. The non-transitory machine-readable medium of claim 18, wherein the operations further comprise:

determining communication of the user equipment is scheduled to be transferred from a source cell device of a source cell of a communications network to a target cell device of a target cell of the communications network based on a movement of the user equipment; and facilitating conveyance of a message from the source cell to the target cell, wherein the message comprises the first information element and the second information element.

* * * * *